R. J. DEARBORN.
POWER TRANSMITTING MEANS.
APPLICATION FILED OCT. 23, 1913.
1,196,089.
Patented Aug. 29, 1916.
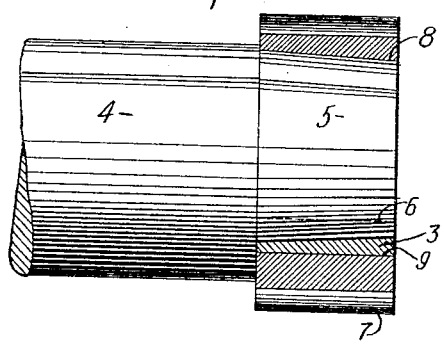
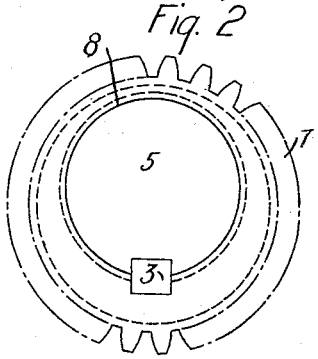
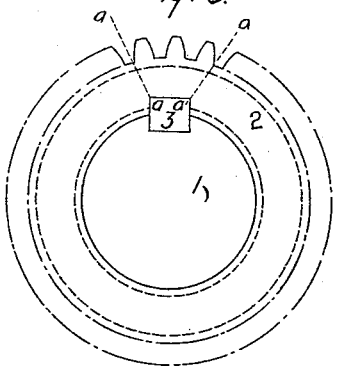
WITNESSES:
Fred A. Lind
W. A. Coley
INVENTOR
Richard J. Dearborn
BY
Wesley G. Carr
ATTORNEY

UNITED STATES PATENT OFFICE.

RICHARD J. DEARBORN, OF MILBURN, NEW JERSEY, ASSIGNOR TO WESTINGHOUSE ELECTRIC AND MANUFACTURING COMPANY, A CORPORATION OF PENNSYLVANIA.

POWER-TRANSMITTING MEANS.

1,196,089.  Specification of Letters Patent.  Patented Aug. 29, 1916.

Application filed October 23, 1913. Serial No. 796,825.

*To all whom it may concern:*

Be it known that I, RICHARD J. DEARBORN, a citizen of the United States, and a resident of Milburn, in the county of Essex and State of New Jersey, have invented a new and useful Improvement in Power-Transmitting Means, of which the following is a specification.

My invention relates to power-transmitting means, and it has special reference to gearing for transmitting the torque of a rotatable shaft, as, for example, the shaft of a railway motor or other dynamo-electric machine.

One object of my invention is to provide a device of the above-indicated character which shall allow of the employment of relatively smaller pinions on the shafts of railway motors and other torque-producing devices than has heretofore been possible.

Another object of my invention is to provide a pinion of the type described which shall be simple and inexpensive to manufacture and shall possess the advantages hereinafter set forth.

The gear ratios, from which a designing engineer may select in equipping a railway vehicle with motors, are limited because the size of the gear wheel is limited to a certain maximum by the available space and because the size of the pinion is limited to a certain minimum by the size of the shaft and the strength of the pinion at its weakest point. When a small pinion, as ordinarily constructed, is unduly strained it usually breaks from one corner of the keyway to an adjacent tooth slot and this is undoubtedly its weakest point. Various attempts have hitherto been made to obviate the difficulty, but all such of which I have any knowledge are comparatively complicated or expensive in construction.

According to my invention, I provide a comparatively simple, reliable and readily manufactured means, for permitting the use of a relatively smaller pinion with safety, comprising an end portion for the shaft body, of any suitable construction, but eccentrically disposed with respect to the axis; a pinion provided with a correspondingly located aperture and having a suitable keyway in its radially thicker part; and suitable means for securing the pinion in position, whereby the pinion and the shaft are substantially coaxial.

In the accompanying drawing, Figure 1 is a view, in longitudinal section, of an assembled power-transmitting device constructed in accordance with my invention, the shaft being shown in elevation; Fig. 2 is a view, in end elevation, of the apparatus shown in Fig. 1; and Fig. 3 is a view, in end elevation, of a similar power-transmitting device as ordinarily employed in the prior art.

Referring first to Fig. 3 of the drawing, an end portion of a shaft 1 is shown as fitted with a customary concentrically bored pinion 2, a key 3 being disposed in suitable registering keyways in the end portion and in the pinion. It will be noted that in small pinions the sections marked *a—a* through which the shaft torque must be transmitted, are unavoidably small in area and weak in construction, by reason of the necessary keyway in the pinion. It is toward means for remedying this fault that my invention is directed.

In Figs. 1 and 2, a shaft body 4 is provided with a tapered end portion 5 that is eccentric with respect to the shaft body 4. A suitable keyway 6 is cut in that part of the end portion surface nearest to the axis of the shaft body, for a purpose hereinafter specified. A pinion 7 has a correspondingly eccentric aperture 8 and a keyway 9 in its radially thickest part. It will be understood that, when the key 3 is operatively disposed in the registering keyways 6 and 9, the axis of rotation of the pinion is substantially coincident with the axis of the shaft, which relation is of course necessary to proper operation.

I do not wish to be restricted to the specific structural details herein set forth, but intend that only such limitations shall be imposed as are indicated in the appended claims.

I claim as my invention:

1. The combination with a power-transmitting member having an eccentrically disposed internal recess, of a shaft having a correspondingly eccentric end portion and positioning means engaging said shaft and said member to position the axes thereof substantially coincident.

2. The combination with a power-transmitting member having an eccentrically disposed internal recess, of a shaft having a correspondingly eccentric end portion and positioning means engaging said shaft and the radially thicker part of said member to position the axes thereof substantially coincident.

3. The combination with a shaft body having an eccentrically disposed end portion, of a power-transmitting member eccentrically recessed to engage said end portion, and means for securing said member to said portion with its axis substantially coincident with the axis of the shaft.

4. The combination with a shaft body having an eccentrically disposed end portion, of a substantially cylindrical power-transmitting member eccentrically recessed to engage said end portion, and positioning means detachably engaging the thicker part of said member and said end portion to dispose the external periphery of said member substantially concentrically with respect to said shaft body.

5. The combination with a shaft body provided with an eccentrically disposed integral end portion having a keyway located in that part of its periphery nearest to the axis of said body, of a gear member eccentrically recessed to engage said end portion and having a keyway in its radially thicker part, and a keying member frictionally engaging said keyways to dispose the external periphery of said gear substantially concentrically with respect to said shaft body.

6. The combination with a rotatable member having a portion eccentrically disposed relative to its axis of rotation, of a gear wheel having an aperture correspondingly disposed, and means for securing the gear wheel on the rotatable member with its axis coincident with the axis of the rotatable member.

7. The combination with a rotatable shaft provided with an end portion eccentrically disposed relative to its axis of rotation and the surface of which is substantially a surface of revolution, of a gear wheel having a substantially cylindrical aperture correspondingly disposed, and means for securing the gear wheel on the shaft with its axis coincident with the axis of said shaft.

8. The combination with a rotatable member having an eccentrically disposed end portion, of a gear having a correspondingly disposed aperture and secured to said member, the axis of said gear being substantially coincident with the axis of said member.

9. The combination with a shaft having a tapered eccentric end portion, of a gear having an aperture correspondingly disposed and secured to said shaft member so that the axis thereof is substantially coincident with the axis of said shaft.

In testimony whereof, I have hereunto subscribed my name this 20th day of October, 1913.

RICHARD J. DEARBORN.

Witnesses:
G. R. QUIMBY,
F. B. GRAVES.

Copies of this patent may be obtained for five cents each, by addressing the "Commissioner of Patents, Washington, D. C."